(12) United States Patent
Cullen

(10) Patent No.: US 9,631,369 B2
(45) Date of Patent: Apr. 25, 2017

(54) CLIP FOR SECURING GUTTER GUARD TO GUTTER

(75) Inventor: James M. Cullen, Aroda, VA (US)

(73) Assignee: EVELYN'S LEAFSOLUTION, LLC, Rochelle, VA (US)

( * ) Notice: Subject to any disclaimer, the term of this patent is extended or adjusted under 35 U.S.C. 154(b) by 742 days.

(21) Appl. No.: 13/490,918

(22) Filed: Jun. 7, 2012

(65) Prior Publication Data
US 2013/0326846 A1 Dec. 12, 2013

(51) Int. Cl.
*E04D 13/068* (2006.01)
*F16B 2/22* (2006.01)
*F16B 2/24* (2006.01)
*E04D 13/076* (2006.01)

(52) U.S. Cl.
CPC ......... *E04D 13/068* (2013.01); *E04D 13/076* (2013.01); *F16B 2/22* (2013.01); *F16B 2/245* (2013.01); *Y10T 24/44932* (2015.01); *Y10T 24/44983* (2015.01)

(58) Field of Classification Search
CPC . E04D 13/076; E04D 13/0725; E04D 13/064; E04D 13/08; E04D 13/0645
USPC .......... 24/546, 460, 462, 457, 545, DIG. 50; 52/12, 11, 15; 248/48.1, 48.2; 210/474; D23/267; 182/107, 214
See application file for complete search history.

(56) References Cited

U.S. PATENT DOCUMENTS

| 3,351,206 | A | * | 11/1967 | Wennerstrom | 210/474 |
| 4,307,976 | A | * | 12/1981 | Butler | 405/118 |
| 4,750,300 | A | * | 6/1988 | Winger, Jr. | 52/12 |
| 4,905,427 | A | * | 3/1990 | McPhalen | 52/12 |
| 5,095,666 | A | * | 3/1992 | Williams, Jr. | 52/11 |
| 5,109,640 | A | * | 5/1992 | Creson | 52/12 |
| 5,459,965 | A | * | 10/1995 | Meckstroth | 52/12 |
| 5,611,175 | A | * | 3/1997 | Sweers | 52/12 |
| 5,819,476 | A | * | 10/1998 | Annestedt, Sr. | 52/11 |
| 6,098,344 | A | * | 8/2000 | Albracht | 52/12 |
| 6,536,165 | B2 | * | 3/2003 | Pilcher | 52/12 |
| D532,291 | S | * | 11/2006 | Geers | D8/394 |
| 7,788,874 | B2 | * | 9/2010 | Miller, Jr. | 52/712 |
| 8,316,585 | B2 | * | 11/2012 | Brochu | 52/11 |
| 2001/0022052 | A1 | * | 9/2001 | Pilcher | 52/14 |
| 2002/0069594 | A1 | * | 6/2002 | Sweet | 52/12 |

* cited by examiner

*Primary Examiner* — Robert J Sandy
*Assistant Examiner* — Rowland Do
(74) *Attorney, Agent, or Firm* — Nixon & Vanderhye, P.C.

(57) ABSTRACT

A clip connecting the outer end of a gutter guard to the outer end of a gutter. The clip has an outwardly extending lower panel, a front panel extending upwardly from an inner end of the lower panel, the front panel merging with an intermediate panel that extends outwardly over the lower panel. The lower and intermediate panels are constructed to engage the outer gutter end to connect the clip thereto. The intermediate panel is folded inwardly at its outer end and merges with an upper panel extending inwardly over the intermediate panel. The intermediate and upper panels are constructed to receive and retain therebetween the gutter guard outer end.

3 Claims, 4 Drawing Sheets

CLIP FOR SECURING GUTTER GUARD TO GUTTER

BACKGROUND OF THE INVENTION

1. Field of the Invention

The present invention relates to a clip for a gutter guard and, more particularly, to a clip for removably securing the front lip or portion of a gutter guard to the front depending lip of a gutter.

2. Description of the Related Art

Gutters are open-top channels that collect and direct water away from a building and its foundation. The opening to the gutter channel must remain unobstructed in order for the gutter to function properly. It is common for debris, such as leaves, cones, seeds, pine needles and the like, to collect and block water flow. Obstruction of the gutter channel causes the gutter to overflow and become ineffective. Many people clean their gutters regularly as part of a preventive maintenance program, while others resort to such devices as covers and guards in an attempt to shield the gutter from the accumulation of debris in the channel.

Many of the gutter guards use a single wire layer to cover the open top of the gutter. Other guards combine a wire layer with a mesh layer to keep debris out. The guard helps prevent large debris, such as cones or seeds, from settling in the gutters. However, smaller particles often slip past such layers. The structure of the guards is generally flat so that the layers lay flat above the opening. Sometimes the integrity of the guard cannot be maintained against heavy debris or debris that has collected and settled on the guard over time.

A new and improved gutter guard that is a subject of a pending patent application comprises elongated panels of any suitable length, which may be mounted end to end on a gutter and may be formed of any suitable material such as aluminum. Each panel is of a perforated, undulating or sinusoidal wave construction comprising a plurality of longitudinally extending, laterally spaced, elongated raised areas for retarding water flow across the panel with recessed channels therebetween. The perforations in the nature of first holes in the panel are closely spaced in longitudinally aligned relation and also in offset lateral relation, and are disposed in the longitudinally extending recessed channels and in the portions of the longitudinally extending raised areas facing the rear of the panel that is intended to be mounted on a portion of a gutter that is attached or to be attached to the adjacent portion of a building or the like near the roof thereof.

In accordance with existing practice and the prior art, the front lip of the gutter guard is attached to the adjacent depending front lip of the gutter by screws or rivets which is time consuming and involves the penetration of both the gutter guard and the gutter. The clip of the present invention serves to removably secure the front lip of the gutter guard to the depending front lip of the gutter without the requiring the use of any connector members such as screws or rivets, or the penetration of the guard and/or the gutter.

SUMMARY OF THE INVENTION

The new and improved clip of the present invention is formed of a suitable flexible and resilient material, such as aluminum, steel or plastic, and is of a generally C-shaped unitary configuration that is open at an outer end portion thereof.

The clip comprises a lower panel with a folded or enlarged portion at an outer end thereof. A front panel extends upwardly and outwardly from an inner end of the lower panel and merges with an intermediate panel that extends downwardly and outwardly over the lower panel beyond the folded or enlarged portion thereof in vertically spaced relation thereto. The intermediate panel is folded inwardly at its outer end and merges with an upper panel extending inwardly over the intermediate panel in vertically spaced relation thereto. The upper panel has a depending tab at the inner end thereof that is positioned above the front panel.

In the use of the clip to removably connect the outer lip or portion of a gutter guard to the adjacent outer depending lip of a gutter, the clip is first positioned over the lip of the gutter such that the gutter lip is disposed between the separated lower and intermediate panels and is engaged by the inner end of the folded or enlarged portion of the lower panel to removably retain the clip on the gutter. Thereafter, the upwardly and outwardly extending lip of the gutter guard is inserted between the intermediate and upper panels to separate them until the depending tab of the upper panel engages the lip of the gutter guard to removably retain it in a position between the upper and intermediate panels and to removably connect the gutter guard to the gutter.

DETAILED DESCRIPTION OF THE INVENTION

Figure 1:
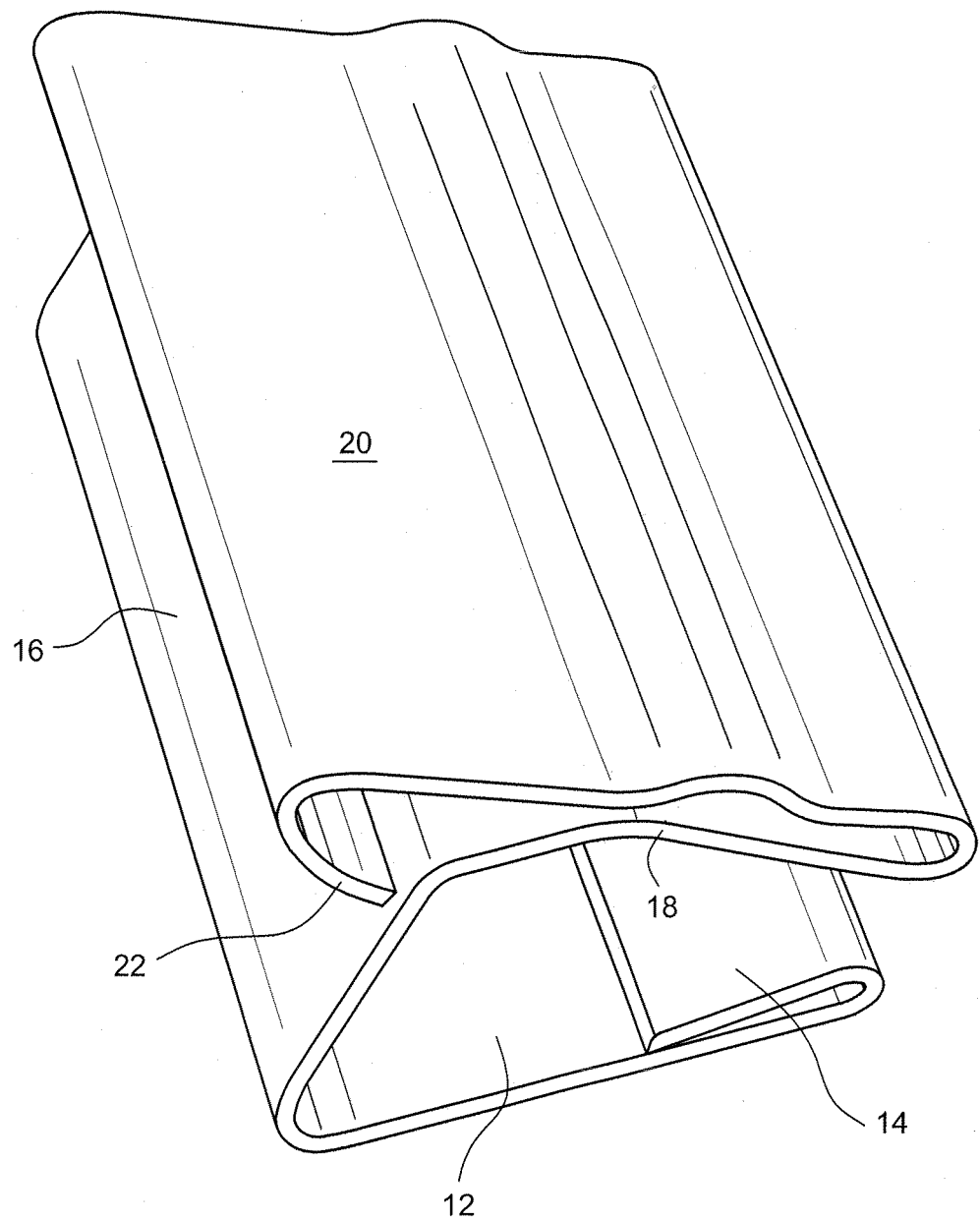
FIG. 1 is a perspective view of one embodiment of the clip of the present invention.
Figure 2:
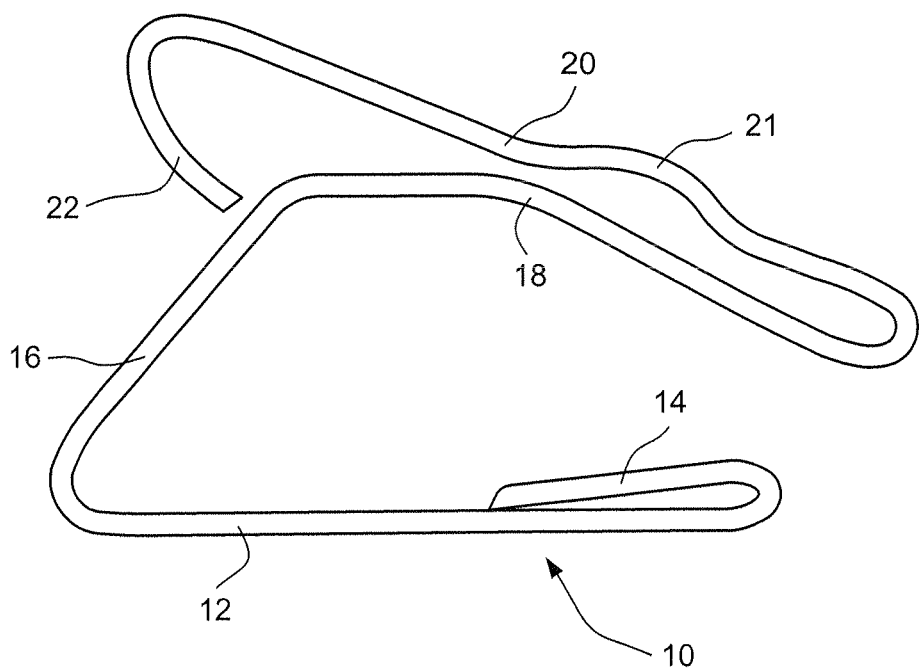
FIG. 2 is a side elevational view of the clip of FIG. 1.

As shown in FIGS. 1 and 2, the clip 10 is formed of a suitable flexible and resilient material, such as aluminum, steel or plastic, and is of a generally C-shaped unitary configuration that is open at the outer end portion thereof.

The clip 10 comprises a lower panel 12 with an upwardly and inwardly extending folded or enlarged portion 14 at the outer end thereof. A front panel 16 extends upwardly and outwardly from the inner end of the lower panel 12 and merges with an intermediate panel 18 that extends downwardly and outwardly beyond the folded or enlarged portion 14 in vertically spaced relation thereto. The intermediate panel 18 is folded inwardly at its outer end and merges with an upper panel 20 extending inwardly over the intermediate panel 18 in vertically spaced relation thereto. The upper panel 20 has a depending tab 22 at the inner end thereof that is positioned above the inclined front panel 16.

Figure 3:
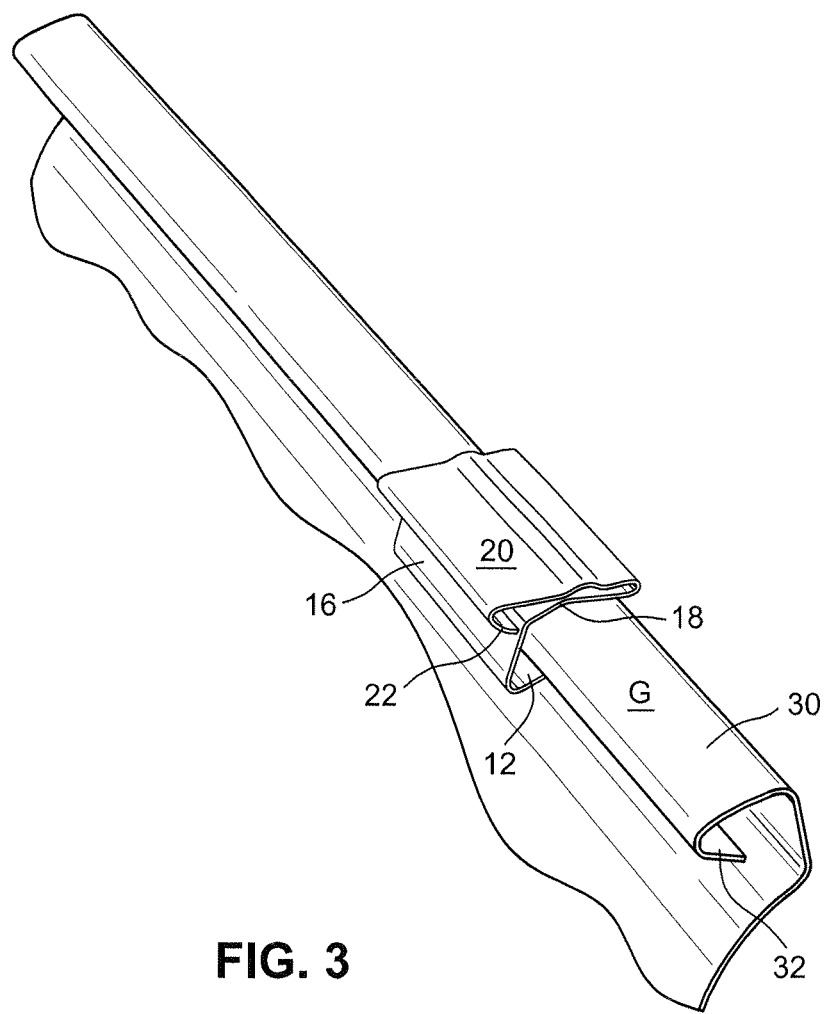
FIG. 3 is a perspective view, with parts broken away, of the clip removably mounted on the outer depending lip of a gutter.

Referring to FIG. 3, to removably connect the outer end portion of a gutter guard to the adjacent outer end portion of a gutter G, the clip 10 is first pushed onto the laterally and inwardly extending portion 30 of the gutter G to separate the lower panel 12 and intermediate panel 18 and to engage and deform upwardly the downwardly and outwardly extending end lip 32 of the gutter G until its outer end is engaged by the inner end of the folded or enlarged portion 14 on the lower panel 12 to removably retain the clip on the gutter G.

Figure 4:
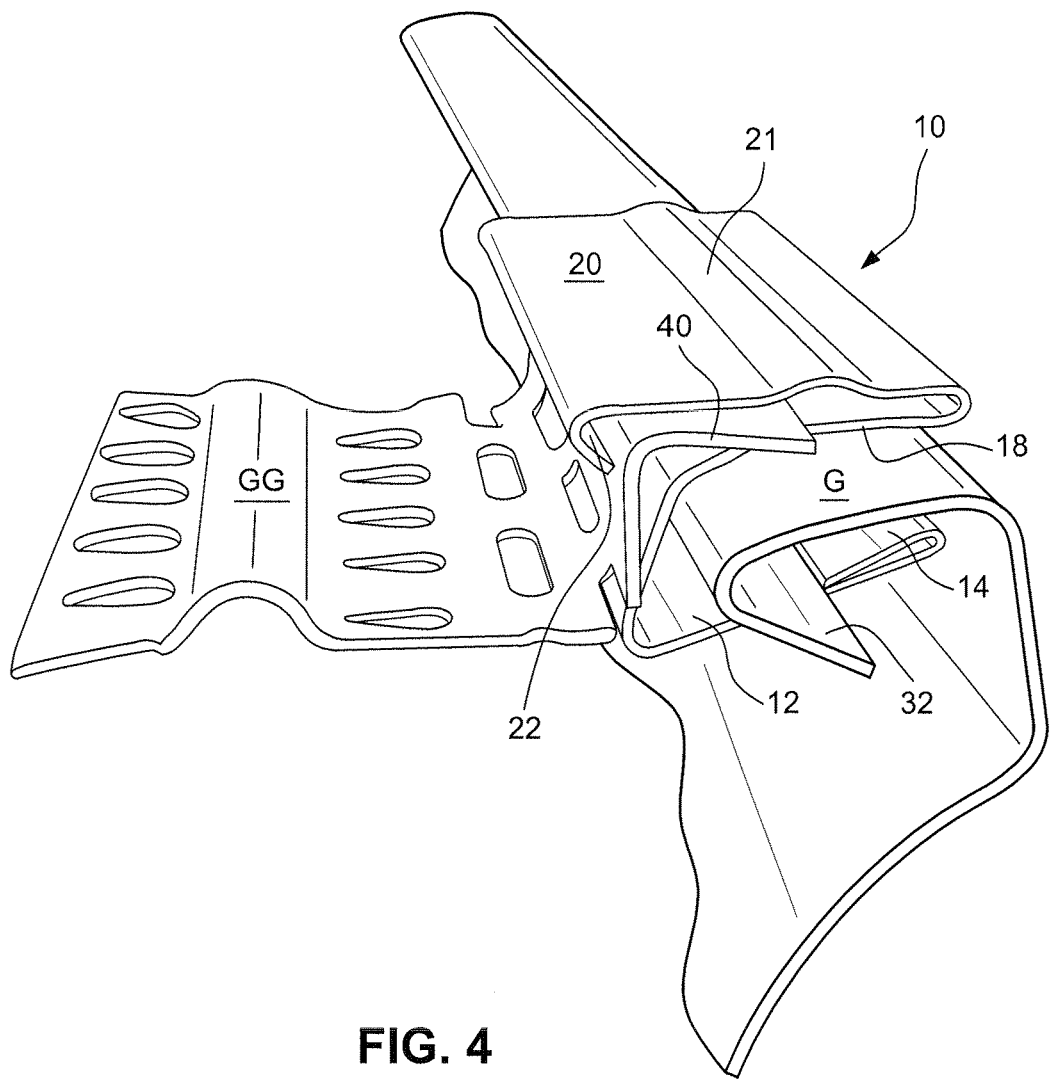
FIG. 4 is a perspective view, with parts broken away, of the clip removably mounted on the outer depending lip of a gutter and removably connected to the adjacent lip of the gutter guard.

Thereafter, as shown in FIG. 4, the adjacent portion of the upwardly and outwardly extending end lip 40 of the gutter guard GG is inserted and pushed between the intermediate panel 18 and the upper panel 20 to separate them until the depending tab 22 on the upper panel 20 snaps over and engages the upwardly extending portion of the gutter guard lip 40 to removably connect the gutter guard GG to the clip 10 and to the adjacent end portion of the gutter G.

Referring to FIGS. 2 and 4, the upper panel 20 may be provided with a raised elongated area 21 which can serve to engage the end of a gutter guard having a bump on it rather than the upwardly and outwardly extending lip 40 shown in FIG. 4.

From the foregoing description, it will be readily seen that the new and improved clip 10 of the present invention provides a simple and inexpensive device for removably connecting the outer end portion of a gutter guard to the adjacent outer end portion of a gutter in a quick, reliable and simple operation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A flexible and resilient clip for removably connecting an upwardly and outwardly extending outer lip of a gutter guard to the underlying outer end portion of a gutter having an inwardly and downwardly and outwardly extending end lip, the clip being of generally C-shaped configuration with an open outer end portion and comprising:

a lower panel with an inwardly folded or enlarged portion at an outer end thereof, a front panel extending upwardly and outwardly from an inner end of the lower panel, the front panel merging with an intermediate panel that extends downwardly and outwardly over the lower panel beyond the folded or enlarged portion thereof in vertically spaced relation thereto, the intermediate panel being folded inwardly at an outer end thereof and merging with an upper panel extending inwardly over the intermediate panel in vertically spaced relation thereto, the upper panel having a depending tab at an inner end thereof that is positioned above the front panel, the clip being positioned on the outer end portion of the gutter so that it is positioned between the lower panel and the intermediate panel to separate them so that an outer end of the gutter end lip is engaged by an inner end of the folded or enlarged portion of the lower panel to removably retain the clip on the gutter, the upwardly and outwardly extending lip of the gutter guard being positioned between the intermediate panel and the upper panel to separate them so that the depending tab of the upper panel extends over and is in engagement with the upwardly extending portion of the gutter guard lip to removably connect the gutter guard to the clip and to the gutter.

2. The clip of claim 1 being formed of unitary construction.

3. The clip of claim 1 wherein the folded or enlarged portion of the lower panel is on an upper surface thereof.

* * * * *